Sept. 14, 1937.  H. L. ROGERS  2,093,391
PREFORMED UNIT AND METHOD OF MAKING THE SAME
Filed Feb. 28, 1933   2 Sheets-Sheet 1
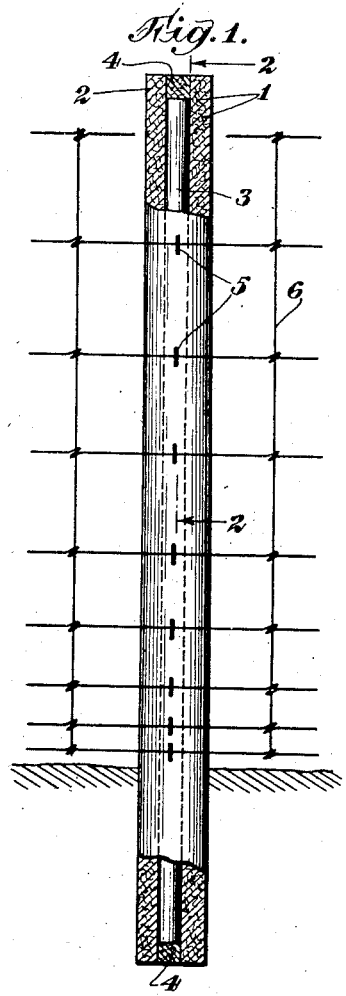
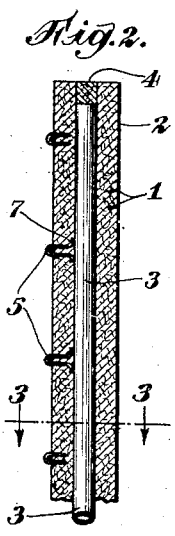
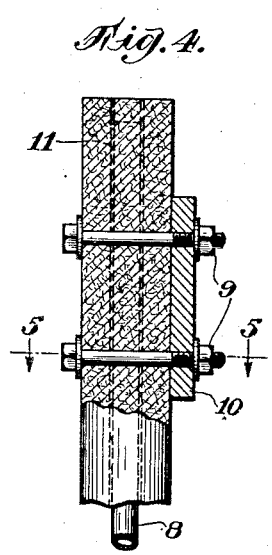
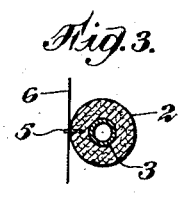
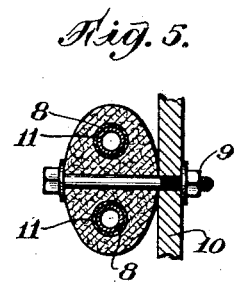
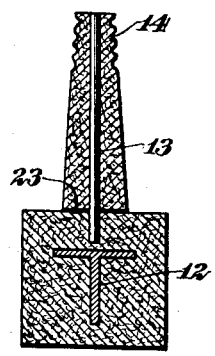
INVENTOR
Homer L. Rogers.
BY D. N. Halstead
ATTORNEY Sept. 14, 1937.  H. L. ROGERS  2,093,391
PREFORMED UNIT AND METHOD OF MAKING THE SAME
Filed Feb. 28, 1933  2 Sheets—Sheet 2

INVENTOR
Homer L. Rogers.
BY D. N. Halstead
ATTORNEY

Patented Sept. 14, 1937

2,093,391

UNITED STATES PATENT OFFICE 2,093,391

PREFORMED UNIT AND METHOD OF MAKING THE SAME

Homer L. Rogers, Larchmont, N. Y., assignor to Johns-Manville Corporation, New York, N. Y., a corporation of New York Application February 28, 1933, Serial No. 658,930

7 Claims. (Cl. 138—64)

This invention relates to a preformed unit and a method of making the same.

It is an object of the invention to provide an economical unit including a rigid core of iron pipe or the like and a preformed, semirigid layer of protective, vibration-damping, and shock-absorbing material disposed around the core. Other objects and advantages will appear from the following description and appended claims.

Briefly stated, the invention in one embodiment comprises a unit adapted for use as a fence post, including a rigid core, a preformed layer of protective material, such as a semi-rigid composition containing asphalt, reenforcing fibers, and a fire-retarding inorganic filler, disposed around the core and protecting its circumferential surface, and preferably including also protective material disposed around the ends of the said core. The invention comprises also a preformed unit of protective material of the type described, provided with a hole therein, suitable for use in the said assembly. In another embodiment the invention comprises a structure, of the said type, in which the core members are sections of pipe, joined at their ends to form a pipeline, and provided over their surfaces with the protective material described, the joints in the protective material being closed, suitably, with weather resistant sealing material.

The invention is illustrated in the drawings in which:

Fig. 1 shows a side elevational view, in part in section, of a fence including a fence post constructed in accordance with the present invention;

Fig. 2 shows a longitudinal sectional view, taken on line 2—2 of Fig. 1;

Fig. 3 shows a transverse sectional view, taken on line 3—3 of Fig. 2;

Fig. 4 shows a side elevation, partly in section, of a modified form of the invention in which transverse metal members also are inserted through the post;

Fig. 5 shows a cross sectional view on line 5—5 of Fig. 4;

Fig. 6 shows a cross sectional view of a modified structure suitable for use as the cross bar and insulator support on a pole of an electric line;

In the various figures like reference characters denote like parts.

Figure 7:
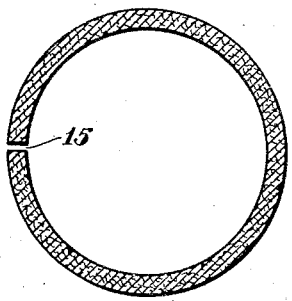
Fig. 7 shows a cross sectional view of a preformed protective layer adapted for use around core members of large diameter.

There are shown preformed and preshaped units of protective material comprising reenforcing fibers 1 and bituminous material 2. This layer is composed suitably of a semirigid composition of the type used in reenforced preformed asphalt products, such as used for industrial flooring. In such a composition the reenforcing fibers are dispersed in the bituminous material. When a high degree of fire resistance is desired, there is present also a substantial proportion of fire-retarding, finely divided inorganic filler. A composition that has been used satisfactorily contains an intimate mixture of asphalt or the bituminous residue from petroleum distillation, reenforcing fibers of rag or asbestos, and mineral filler, say 25 parts by weight of asphalt, 15 parts of rag fiber, and 60 parts of filler. A satisfactory filler is finely divided calcium carbonate, sand, diatomaceous earth, or ground cinders.

Disposed within the layer of protective material is a rigid core member 3 that may consist of a cylinder of iron or steel of small diameter, as, for example, used, discarded steam-boiler tubes. The core member in the unit adapted for use for such purposes as a fence post or cross-bar on an electric line post is suitably of lesser length than the outer protective layer, to leave a cylindrical space at the end of the core member. In such a case, corrosion resistant, protective material 4 may be used to fill this space and seal the ends of the unit, and thus protect the ends of the core member, in the same manner as the outer layer of preformed material protects the circumferential surface of the core; such a structure is non-corrodible in all parts of its exterior surface. This end-protecting material 4 may consist of bituminous material adapted to be rendered fluid, as by warming, and to be hardened after application, as by cooling.

A post of the type described is nailable, that is, adapted to receive and firmly hold driven fastening elements such as the staples 5, securing fence 6 to the post. The staples driven through the protective material may be clinched against the rigid core as illustrated at 7 in Fig. 2.

If desired, there may be substituted a plurality of longitudinally extending core members 8 for the single core described. Also, the post may be drilled to receive transverse metal members, such as the bolts 9 which secure the post to another structure, such as the element 10, that may be a horizontal plank of a bridge banister or the like.

The core member may fit snugly within the hole in the preformed layer of protective material or may fit loosely therein to leave an annular space. In such a case, the annular space may be filled by pouring a flowable but hardenable sealing material, such as a warm thermoplastic material, into the space and causing the said material to harden, as by cooling. This structure is illustrated in Figs. 4 and 5, in which the sealing material is shown at 11. The sealing material may be more readily conformable to an irregular surface, such as a corroded or pitted iron pipe, than is the said protective material. In general, the covering layer is thick and is disposed around and in close proximity to the core member, that is, disposed directly in contact therewith or adhered thereto by a thin layer of adhesive, as illustrated.

If desired, the core member may have another form than cylindrical or tubular. Thus, there may be used a T bar 12 as illustrated in Fig. 6.

For use as a support for electrical equipment, as in the cross-bars on posts in telephone or electric transmission lines, the core member may be an electrically non-conducting element 13 enclosed in the preformed unit of protective material of suitable shape. Thus the protective material may have a tapered and threaded outer surface 14 adapted to receive a threaded glass insulator. The non-conducting core element may consist of conventional material of suitable rigidity, dielectric, and other properties, as, for example, a glass rod, hardened phenol-aldehyde resin, hard rubber, or the like.

When the core member is of large diameter, as, for example, sections of pipe suitable for use in an oil or gas pipeline, the preformed layer of protective material may be provided with a longitudinal slit 15 extending the full length of the unit and from the hole in the center thereof to the outer surface, whereby the unit is adapted to be sprung open, inserted around the pipe, and then restored to its original shape. Or, as illustrated in Fig. 8, the unit of protective material of large diameter may be made in the form of the semitubes 16 that may be placed around a pipe of outside diameter approximately equal to the inside diameter of the united semitubes.

Figure 8:
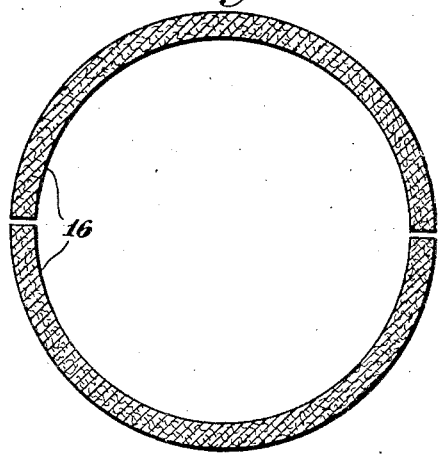
Fig. 8 shows a cross sectional view of a layer of the same type formed in semitubular halves.
Figure 9:
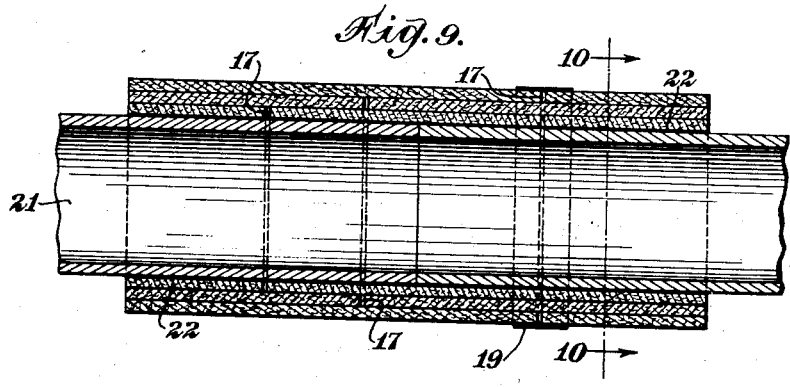
Fig. 9 shows a longitudinal sectional view of a portion of a pipeline with layers of protective material disposed therearound.
Figure 10:
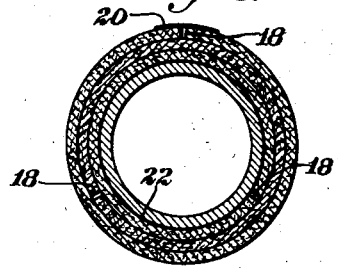
Fig. 10 shows a cross sectional view on line 10—10 of Fig. 9.

When such protective material, in the form illustrated in Fig. 7 or 8, is placed around a pipe, the circumferential joints and longitudinal joints in the protective material may be closed by sealing material that is suitably bituminous. This sealing material is indicated at 17 for the circumferential or end joints between the several units of preformed protective material and at 18 for a longitudinal joint within a given unit. The preformed protective units may be arranged with the end or circumferential joints and also the longitudinal joints broken, that is, positioned in non-registering relationship, in several concentric layers, as illustrated in Figs. 9 and 10.

Sections of preformed protective material, abutting to form end joints, may be provided also with strips 19 of waterproof material, such as asphalt-impregnated rag felt, adhered over the joint by means of bituminous cementing material. Such strips will form a complete ring around the joint. Likewise, longitudinal joints in the protective material may be similarly closed by longitudinal strips 20 and cementing material of the type described. The protective material is adhered to pipe 21 by cement 22, such as asphalt and is dense and resistant to crushing.

In making structures of the type described, the materials that are to compose the protective layers or units may be made into an intimate mixture in a mastic mixer, at such a temperature as to facilitate the mixing, say at approximately 175° F. or above, and the mixture then extruded through a warm die in tubular form. If the core member is to be inserted into the tube from an end position, to give a structure of the type illustrated in Figs. 1-6, the insertion is made when the extruded tube is semirigid in the exterior portions, to permit satisfactory handling, and at the same time is readily deformable in the interior, to facilitate the insertion of the core member. To produce such a condition, the extruded tube may be subjected to exteriorly applied cooling means, as, for example, a shower of cold water, to chill the exterior while preserving the plasticity or ready deformability of the interior. The core member is then inserted and the assembly cooled to atmospheric temperature. During the cooling, the interior of the tube hardens.

Or, to assist in the insertion of the core member, the core member may be provided with a coating of asphaltic material in relatively fluid form, say a solution of a cementing material in an active solvent for bitumen, as a solution of 70 parts of asphalt in 30 parts of gasoline. Also, the core member may be preheated to a temperature adapted to soften bitumen in the said unit, as, for example, to 400° F., and then inserted in warm condition.

When the core member is of lesser length than the preformed protective layer, the core member may be inserted to leave a cylindrical space at both of its ends. This cylindrical space may be filled with melted asphaltic or other plastic sealing material of type described. The assembly so made is then allowed to cool to atmospheric temperature, during which cooling the sealing material hardens and the core becomes welded to the outer layer of protective material.

In making a structure of the type illustrated in Figs. 4 and 5, the procedure is modified in that the protective material is extruded through a die to form a plurality of longitudinal, parallel holes in the extruded unit. Into these holes there may be inserted core members, fitting snugly therein, as described above, or there may be inserted core members leaving annular spaces around the cores, the spaces being then filled by means of a warm, relatively fluent sealing material 11 adapted to be hardened when the final assembly is cooled to atmospheric temperature. The sealing material should be less viscous or rigid and adapted to conform better to irregularities of surface, such as a corroded, pitted surface of the core member, than the protective material itself, various units of the protective material may be adhered together, as by the layer 23 of asphalt or the like illustrated in Fig. 6.

The preformed units of protective material of large diameter, illustrated in Figs. 7-10, may be extruded through a suitable die, as described above, and then quickly chilled throughout, as by cold water applied to the unit, immediately after the extrusion. The longitudinal slits 15 may be provided by means of a saw.

Two such slits may be provided 180 degrees apart, to divide the extruded tube into semitubes of the type shown in Fig. 8, or the semitubes may be separately extruded.

The pipe covering illustrated in Figs. 7–10 may be adhered to pipe disposed therewithin by a cementing material, such as asphalt, that is more fluent at elevated temperatures than the preformed units of protective coating material.

Protective material of the type described minimizes the corrosion of corrodible core members and at the same time is itself fire- and corrosion-resistant. It is adapted to damp vibrations and to receive driven fastening means, such as the staples 7. In the case of the fence post, crossarm for the post in a telephone line, or other unit comprising a slender, elongated core, the protective material constituting the outer shell possesses sufficient rigidity and inertia to stiffen the structure.

In the case of sections of large pipes which are of themselves quite rigid, the protective material serves additional and important functions that are not served by the usual type of bituminous coating applied to protect such lines against corrosion. The present material is resistant to being gouged or injured during the installation of the pipeline and is sufficiently resilient to absorb or minimize the effect of temporary, sudden shocks applied to the outside of the line. The material is also free from pin holes and imperfections which may be found in carelessly applied bituminous coatings of the type previously used. The present type of protective material is particularly adapted and desirable for use around pipelines in sections extending under highways. It will be understood that the protective material contains plastic material and reenforcing fibers thoroughly distributed therethroughout, whereby strengthening and reenforcing is obtained.

The term iron as used herein includes steel.

The details that have been given are for the purpose of illustration and not restriction. Variations therefrom may be made within the scope of the appended claims.

What I claim is:

1. An article of manufacture comprising a preformed, fiber-reenforced, bituminous unit provided with a hole therethrough, a rigid core member disposed therein and terminating short of the ends of the hole, and corrosion resistant protective materials disposed within and closing the said ends of the hole.

2. An assembly comprising the combination of a section of pipe and a corrosion resistant protective coating therefor, including preformed, semirigid units of fiber-reenforced bituminous material disposed around and completely enclosing the circumferential surface of the pipe, the said units being provided severally with longitudinal joints and arranged around the pipe in a plurality of concentric layers, with joints in the several layers in non-registering relation.

3. An assembly comprising the combination of a section of pipe, a corrosion resistant protective coating therefor, including preformed, semirigid units of fiber-reenforced bituminous material disposed around and completely enclosing the circumferential surface of the pipe, the said units being provided severally with longitudinal joints and with circumferential joints between the several units, and arranged around the pipe in a plurality of concentric layers with longitudinal and circumferential joints in non-registering relation in the several layers, and a non-corrodible, weather-resistant sealing material disposed within and closing the said joints.

4. A post comprising a rigid elongated core member, a preformed and preshaped protective layer, including a bituminous material and reenforcing fibers and a substantial proportion of incombustible finely divided filler dispersed in the bituminous material, disposed around the core, and plastic sealing material adhering the protective layer to the core, the said sealing material being more readily conforming and adherent to the core than the said protective layer.

5. A structural unit comprising a rigid core member and a semirigid nailable preformed covering disposed therearound and in close proximity thereto, the said covering including a thick layer of asphalt, reenforcing fibers, and granular filler, the fibers and filler being dispersed throughout the asphalt, and the proportions of materials in the covering being of the order of 25 parts by weight of asphalt, 15 of fiber, and 60 of filler.

6. A fence post comprising an iron core member, a semirigid preformed composition extending therearound and a cementing material adhering the core to the semirigid composition, the semirigid composition being adapted to receive driven fastening elements, including an intimate mixture of a bituminous material, reenforcing fibers and a substantial proportion of an incombustible finely divided filler, and being resistant to fire and corrosion.

7. A support for electrical equipment comprising an electrically non-conducting core member, a semirigid preformed composition extending therearound and a cementing material adhering the core to the semirigid composition, the semirigid composition being adapted to receive driven fastening elements, including an intimate mixture of a bituminous material, reenforcing fibers and a substantial proportion of an incombustible finely divided filler, and being fire-resistant.

HOMER L. ROGERS.